United States Patent [19]

Ylonen et al.

[11] Patent Number: 5,809,743
[45] Date of Patent: Sep. 22, 1998

[54] TOP FOLDING AND SEALING APPARATUS FOR FORMING AND SEALING THE FIN OF A GABLED CARTON

[75] Inventors: Karl D. Ylonen, Oak Park Heights; John M. Tovey, Circle Pines, both of Minn.

[73] Assignee: Tetra Laval Holdings & Finance, SA, Pully, Switzerland

[21] Appl. No.: 828,311

[22] Filed: Mar. 28, 1997

[51] Int. Cl.⁶ .............................. B65B 61/00; B65B 7/16
[52] U.S. Cl. ...................... 53/370.6; 53/372.4; 53/370.7; 53/133.2; 493/133; 493/135
[58] Field of Search .............................. 53/477, 484, 491, 53/370.6, 370.2, 371.4, 372.4, 370.7, 371.3, 565, 377.8, 378.3; 493/133, 134, 135, 114, 929, 923, 102, 103, 210, 213, 214

[56] References Cited

U.S. PATENT DOCUMENTS

| | | |
|---|---|---|
| 2,410,587 | 11/1946 | Monroe . |
| 2,669,815 | 2/1954 | Zinn et al. ...................... 53/370.6 X |
| 2,850,953 | 9/1958 | Barker et al. . |
| 3,579,958 | 5/1971 | Hentges ...................................... 53/565 |
| 3,910,171 | 10/1975 | Reinhardt et al. . |
| 4,071,999 | 2/1978 | Nolet .................................. 53/370.6 X |
| 4,145,236 | 3/1979 | Neumayer et al. . |
| 4,236,368 | 12/1980 | Nerenberg et al. ........................ 53/491 |
| 4,403,465 | 9/1983 | Bachner ...................................... 53/477 |
| 4,698,950 | 10/1987 | Marchetti . |
| 4,736,077 | 4/1988 | Valente . |
| 4,894,104 | 1/1990 | Hemus ...................................... 53/491 |
| 4,990,128 | 2/1991 | Murrah . |
| 5,106,359 | 4/1992 | Lott . |
| 5,454,776 | 10/1995 | Ulrich et al. . |
| 5,486,152 | 1/1996 | Heinz et al. . |
| 5,518,578 | 5/1996 | Persell et al. . |
| 5,538,491 | 7/1996 | Owen et al. . |
| 5,642,606 | 7/1997 | Ohlsson ...................................... 53/565 |

Primary Examiner—Linda Johnson
Attorney, Agent, or Firm—Michael A. Catania

[57] ABSTRACT

An apparatus for forming and sealing a fin at a gabled end of each carton in a plurality of cartons traveling along a predetermined carton path is set forth. In accordance with the apparatus, each carton has a first plurality of opposing top flaps disposed transverse to the predetermined carton path and a second plurality of opposing top flaps disposed longitudinal to the predetermined carton path. The first and second plurality of opposing top flaps are adapted to form a gabled structure of the gable top container. The apparatus includes a first pre-folder for directing the first pair of opposing top flaps of each carton toward each other, thereby also causing the second pair of opposing top flaps to be urged toward each other. A second pre-folder is disposed downstream of the first pre-folder along the predetermined carton path for increasingly directing the second plurality of opposing top flaps of each carton together as each carton travels along the predetermined carton path. A rotating crimping mechanism is disposed downstream of the second pre-folder for bending the second plurality of opposing top flaps to form a narrowed fin structure as each carton proceeds therebetween along the predetermined carton path. A sealing mechanism is disposed downstream of the rotating crimping mechanism for sealing the fin of each carton by introducing energy to the fin. A corresponding method is also disclosed.

7 Claims, 3 Drawing Sheets

TOP FOLDING AND SEALING APPARATUS FOR FORMING AND SEALING THE FIN OF A GABLED CARTON

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

Gable top cartons have been known for the better part of the twentieth century. Their characteristic simplicity and resealability have helped to sustain their popularity as cartons for traditional liquid food products such as milk and juice, but in recent years they have been used for products ranging from ammunition to Epsom salts. Gable top cartons typically start out as generally rectangular carton blanks made of laminated paperboard or similar material. The carton blanks are provided with a number of creases to facilitate folding and forming the blank into a carton.

During decades of development, manufacturers of packaging machines have devised a variety of ways to form, fill and seal gable top cartons. Today, the most prevalent packaging machines for filling and sealing gable top cartons are adapted to receive the carton blank after it has been side sealed. The process of side sealing involves sealing opposite vertical edges of the carton blank together to form a polygonal (usually rectangular) sleeve. The sleeve is received on an indexable mandrel wheel which rotates the sleeve into respective positions where the end of the sleeve extending outwardly from the mandrel is folded and sealed to form the bottom of the carton.

After the carton bottom has been formed, it is removed from the mandrel and transported to a filling station where the carton is filled with product. Once the carton has been filled, the top of the carton is folded into the familiar gable top configuration and is heat sealed, thus completing the packaging process.

One example of a known packaging machine that operates generally in accordance with these principles is described in U.S. Pat. No. 5,518,578 to Persells, et al. Other examples of such packaging machines are described in U.S. Pat. No. 3,789,746 to Martensson, et al., U.S. Pat. No. 3,820,303 to Martensson, et al., U.S. Pat. No. 4,759,171 to Bruveris, et al., and U.S. Pat. No. 4,790,123 to Ljungstr'm, et al. These patents are hereby incorporated by reference.

Various mechanisms are known for sealing the fin at the gabled end of the gable top carton. One such mechanism is disclosed in U.S. Pat. No. 3,200,557 to Schwenk. In accordance with the teachings of that patent, the upper flap panels that form the gabled structure, including the fin, are first heated to allow the polyethylene coating on the cartons to soften. The carton is then transported to a position between two sealing jaws. The sealing jaws move toward one another and apply pressure to form and seal the fin.

As the sealing jaws move toward one another, it is possible for the opposed flaps that are perpendicular to the jaws to extend outward as opposed to inward toward the carton. This condition is known as "duckbilling" and renders the carton and its contents unusable.

Various mechanisms have been devised to reduce or eliminate such "duckbilling." One such mechanism is disclosed in U.S. Pat. No. 4,738,077 to Wakbayashi et al. The mechanism described in the '077 patent utilizes an inverted, V-shaped claw to pre-fold the opposed flaps at the gabled end of the carton. This pre-folding takes place at a processing station of the packaging machine that is disposed prior to the sealing station at which the fin is sealed.

Another mechanism for partially closing containers is disclosed in U.S. Pat. No. 2,410,587 to Monroe. The mechanism described in the '587 patent utilizes a pair of opposed folding finger supporting arms 24 and 25. The arms are horizontally disposed and are parallel. This partial folding takes place at a processing station of the packaging machine that is disposed prior to the sealing station at which the carton could be sealed.

In addition, a further carton sealing method and apparatus as disclosed in U.S. Pat. No. 4,145,236 to Neumayer, et al. In particular, FIG. 3 of the '236 patent illustrates closing plates 52 having edges 53 that cooperate to define a closing slot 55. The closing slot 55 flares inwardly and downwardly from inlet ends 54 of the edges 53 to outlet ends 56 of the edges 53.

Although such pre-folding of the opposed flaps may assist in reducing "duckbilling," the foregoing mechanisms are not necessarily the most desirable solutions to the problem, particularly in high speed packaging machines. Such systems are often slow and costly. A more cost effective and efficient solution would be beneficial.

BRIEF SUMMARY OF THE INVENTION

An apparatus for forming and sealing a fin at a gabled end of each carton in a plurality of cartons traveling along a predetermined carton path is set forth. In accordance with the apparatus, each carton has a first plurality of opposing top flaps disposed transverse to the predetermined carton path and a second plurality of opposing top flaps disposed longitudinal to the predetermined carton path. The first and second plurality of opposing top flaps are adapted to form a gabled structure of the gable top container. The apparatus comprises a first pre-folder for directing the first pair of opposing top flaps of each carton toward each other, thereby also causing the second pair of opposing top flaps to be urged toward each other. A second pre-folder is disposed downstream of the first pre-folder along the predetermined carton path for increasingly directing the second plurality of opposing top flaps of each carton together as each carton travels along the predetermined carton path. A rotating crimping mechanism is disposed downstream of the second pre-folder for bending the second plurality of opposing top flaps to form a narrowed fin structure as each carton proceeds therebetween along the predetermined carton path. A sealing mechanism is disposed downstream of the rotating crimping mechanism for sealing the fin of each carton by introducing energy to the fin.

Other objects and advantages of the present invention will become apparent upon reference to the accompanying detailed description when taken in conjunction with the following drawings.

DETAILED DESCRIPTION OF THE INVENTION

Figure 1:
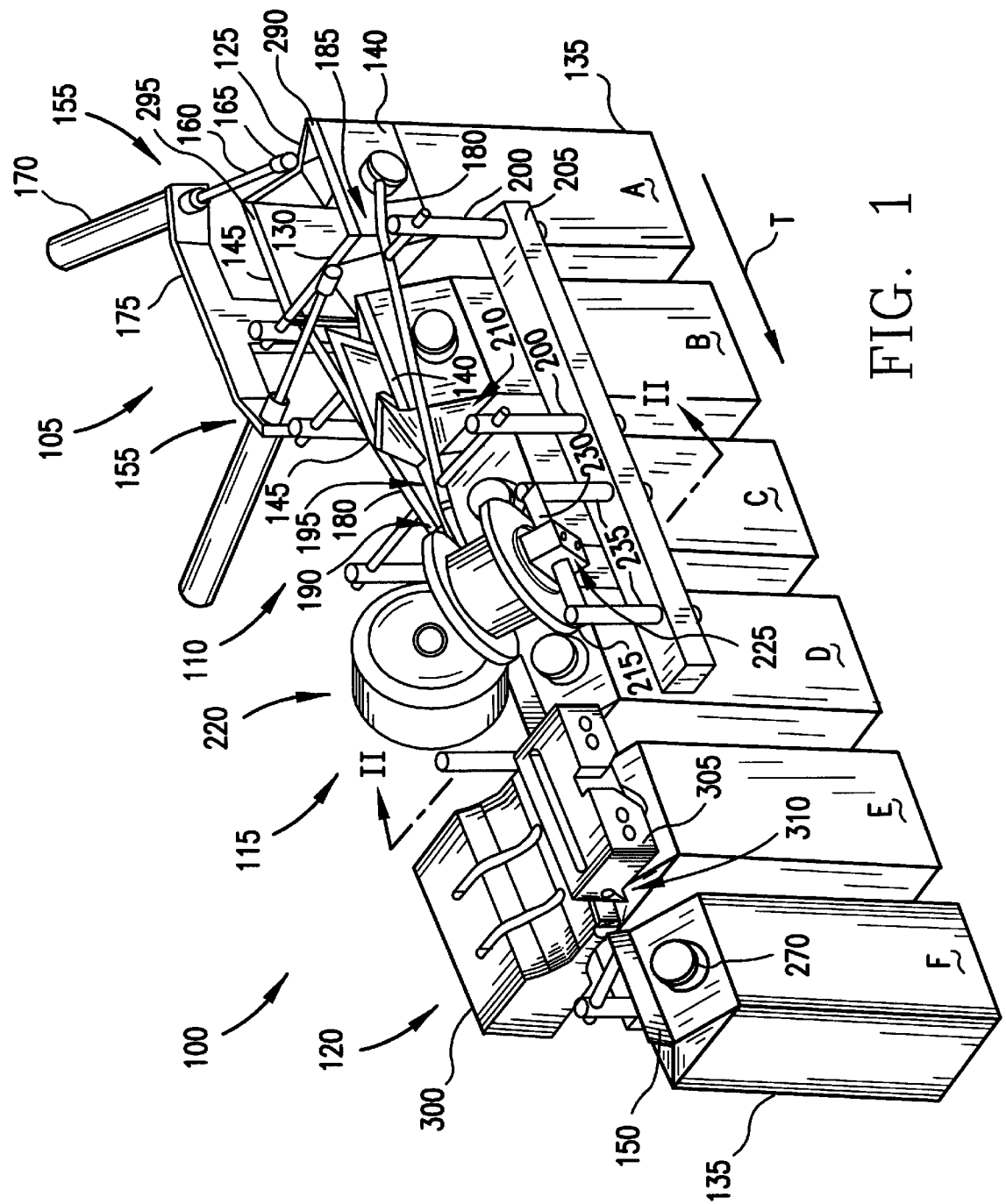
FIG. 1 is a perspective view of one embodiment of the present forming and sealing apparatus.

FIG. 1 illustrates one embodiment of a high-speed, forming and sealing apparatus for forming and sealing a gable-top container. The apparatus, shown generally at 100, is comprised of a transverse pre-folder 105, a longitudinal pre-folder 110, a fin folder 115, and a sealing apparatus 120. The transverse pre-folder 105 is used to pre-fold panels 125 and 130 that are disposed transverse to the direction of travel (indicated by arrow T) of a container 135 through the apparatus 100. The longitudinal pre-folder 110 is used to pre-fold the panels 140 and 145 that are disposed along the direction of travel T of the container 135. The fin folder 115 is used to urge the panels forming the gabled top of the container 135 to a formed orientation for subsequent sealing of a resulting upstanding fin 150 by the sealing apparatus 120.

The embodiment of the transverse pre-folder 105 illustrated in FIG. 1 comprises a pair of actuator arms 155. Each actuator arm 155 is preferably comprised of a rod portion 160 and an end tip 165 that are, for example, driven by a respective linear actuator 170, such as a hydraulic actuator. The actuator arms 155 and linear actuators 170 are supported by a bracket 175 that, for example, is fixed within the packaging machine.

During a production cycle of the packaging machine, the actuator arms 155 are operated to move between a first position in which the arms 155 are clear of the path of a container 135 moving through the apparatus 100 and a second position in which the arms 155 engage and pre-fold the transverse panels 125 and 130 of the container 135.

In the illustrated embodiment, the longitudinal pre-folder 110 is comprised of a pair of guide rails 180 disposed on opposite sides of the container path. As illustrated, the guide rails 180 form an approximately V-shaped opening 185 which tapers down to form a narrow channel 190. A vertex 195 of the V-shaped opening 185 is also illustrated. The guide rails 180 are held in position by support rods 200. In turn, the support rods 200 are held by a bracket 205 that, for example, is fixed within the packaging machine. The guide rails 180 are arranged to accept the carton 135 with its top gable structure 210 in a pre-folded condition from the traverse pre-folder 105. The carton 135 is accepted by the longitudinal pre-folder 110 at the wide end of the guide rails 180 (i.e., the V-shaped opening 185). As the cartons 135 travel in direction T along the container path, the top lateral flaps 140 and 145 are closed by the tapering reduction in width of the V-shaped opening 185 to the channel 190.

The fin former 115 of the illustrated embodiment is comprised of a first crimping wheel 215 and a second crimping wheel 220 disposed at an angle on opposite sides of the container path. The first crimping wheel 215 is connected to an axle block 225 that is supported by a horizontally disposed rod 230 that is connected between a pair of vertically disposed rods 235. The vertically disposed rods 235 are disposed for support on bracket 205. A corresponding support arrangement is provided for the second crimping wheel 220 disposed on the opposite side of the container path.

Figure 2:
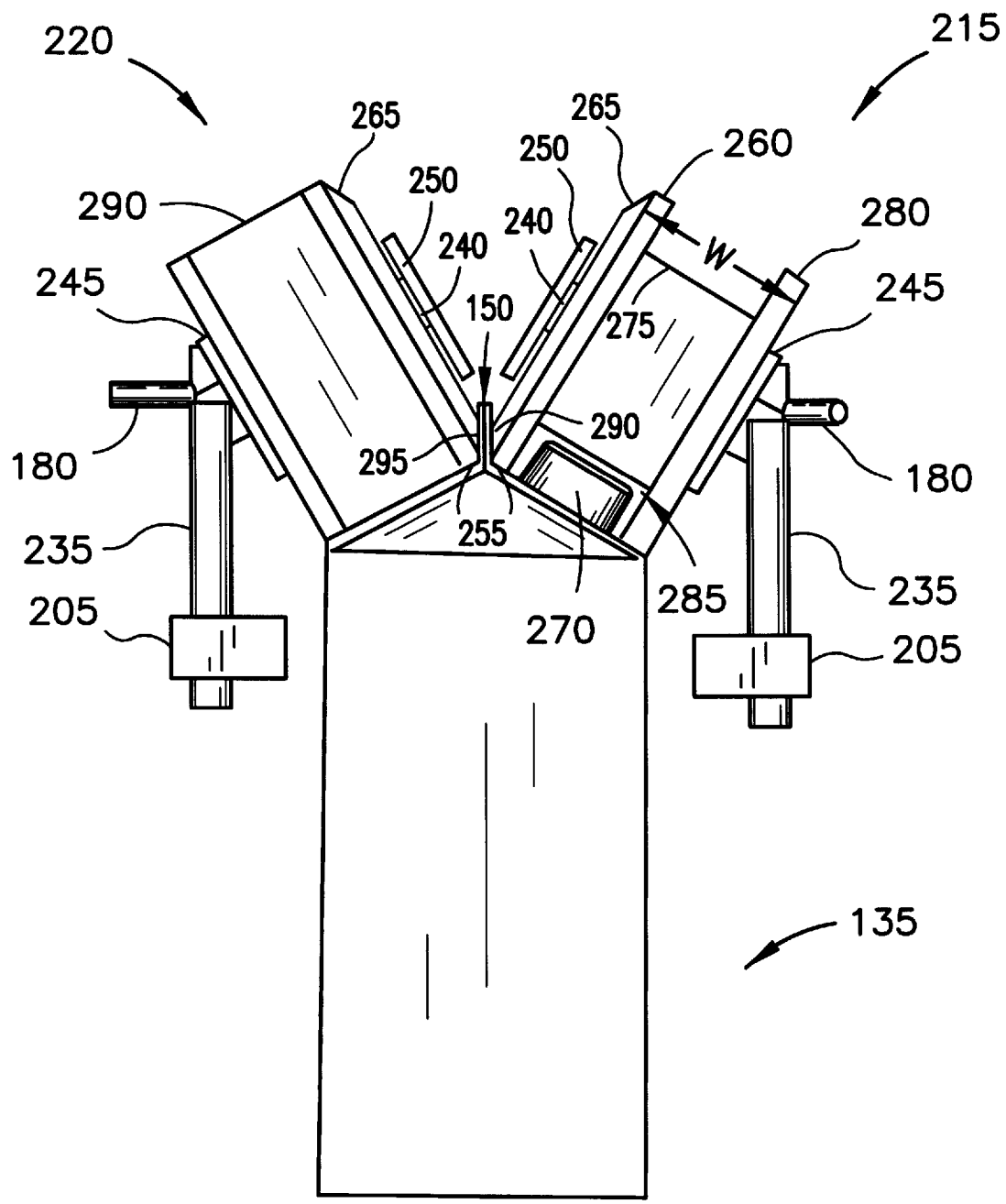
FIG. 2 is a side section view of FIG. 1 taken along section line II—II.

FIG. 2 illustrates a cross-sectional view of the carton stream of FIG. 1 taken along section lines II—II. As illustrated, the first crimping wheel 215 rotates on an axle 240 which is mounted to the axle block 225 (see FIG. 1) to support the crimping wheel 215 at an upwardly extending angle that generally coincides with the angle of the overlying panels of the gable top structure. The first crimping wheel 215 is held in place between first and second retaining plates 245 and 250, respectively. The retaining plates 245, 250 maintain the position of the first crimping wheel 215 at its proper location to crimp the fin 150 along a horizontal crease 255. To this end, the first crimping wheel 215 includes an outer lip 260 having a beveled portion 265 which is set at an angle to crimp the fin 150 along the horizontal crease 255 such that fin flaps of the container 135 are pressed to extend in a vertical direction. The angle on the beveled portion 265 is preferably approximately equal to the angle of the wheel with respect to the vertical axis. The first crimping wheel 215 preferably has a width W that is sufficiently large to allow the lower portion of the first crimping wheel 215 to engage the base of the gable top structure 210 at the same time as the fin 150 is formed and engaged by the bevelled upper portion 265 of the first crimping wheel 215.

The illustrated embodiment is designed to accept cartons 135 having a spout 270 disposed in the overlying panels of one side of the gable top structure 210. To accommodate such cartons, the first crimping wheel 215 further comprises a recessed portion 275 flanked by an inner lip 280 and the outer lip 260. As mentioned above, the recessed portion 275 of the first crimping wheel 215 provides a hollow region 285 that allows the spout 270 to pass the first crimping wheel 215 without interfering with or obstructing the operation thereof.

The second crimping wheel 220 is substantially identical to the first crimping wheel 215, except that it lacks the recessed portion 275. This is primarily because a second screw cap in most cases would be unnecessary on the carton 135. However, in the event that the carton 135 did include an obstruction on the overlying panels opposite the panels through which the spout 270 is disposed, the second crimping wheel 220 could be constructed similarly to the first crimping wheel 215 and have a corresponding cut-out portion. Alternatively, if the carton 135 did not have any spout 270, the first crimping wheel 215 would be identical to the second crimping wheel 220.

The second crimping wheel 220 has the similar beveled face 265 and a flat surface 290. The beveled face 265 crimps the carton 135 along the horizontal crease 255 so that top fin flaps 290, 295 are approximately vertical during and after passing through the crimping wheels 215, 220.

Referring back to FIG. 1, the sealing apparatus 120 of the illustrated embodiment is comprised of a pair of sealing jaws disposed on opposite sides of the container path to define a sealing zone therebetween. Preferably, the sealing apparatus 120 is an ultrasonic sealer that is comprised of an ultrasonic horn 300 and corresponding anvil 305 that may be operated to move between a first relative position in which a sealing zone 310 is sufficiently wide to accept the pre-formed fin 150 from the fin former 115 therebetween and a second relative position in which the ultrasonic horn 300 and the anvil 305 engage and seal the fin 150.

Preferably, the outlet end of the fin former 115 is less than a full fin width away from the input end of the sealing zone 310 of the sealing apparatus 120. Such positioning allows the sealing zone 310 between the horn 300 and anvil 305 to have a minimal width, thereby reducing the distance that the horn 300 and/or anvil 305 must travel between the first and second relative positions. The reduced travel distance allows the sealing apparatus 120 to be constructed more compactly and, further, reduces the sealing cycle time.

The embodiment illustrated in the FIG. 1 depicts a number of cartons 135 traveling in the direction indicated by arrow T. The individual cartons 135 are labeled A through F and are disposed at various positions within the apparatus 100 and illustrate the operating stages of the apparatus 100.

Carton A illustrates the carton 135 having its top fin flaps 290, 295 and top panels 125, 130 and 140, 145 in a generally vertical orientation. The tips 165 of the actuator arms 155 operate to press in the transverse flaps 125 and 130. This action is performed to prevent the "duckbilling" described above. Once this is done, the lateral flaps 140, 145, now partially folded toward each other as a result of the transverse pre-folding operation, as illustrated by carton B, enter the wide end 185 of the transverse pre-folder 110 between the guide rails 180. This operation is illustrated with respect to carton B. As the carton 135 is conveyed toward the outlet end of the longitudinal pre-folder 110, the lateral fin flaps 290, 295 and panels 140, 145 of the top gable structure are urged toward one another as a result of the narrowing of the region between the guide rails 180. Carton C illustrates this operation.

Carton D is illustrated in a position in which it is being crimped between the crimping wheels 215, 220. The gable structure 210 of carton D is thus formed such that the fin 150 is closed tightly and oriented vertically for subsequent sealing by the sealing apparatus 120.

Carton E is illustrated as being in the sealing zone 310 between the horn 300 and anvil 305. While in this position, the horn 300 and/or anvil 305 are operated to go from the first relative position to the second relative position at which point ultrasonic sealing energy is applied to seal the fin flaps 290, 295 to one another to form the fin 150 of the gable top structure 210. After a predetermined length of time in the second relative position, the horn 300 and/or anvil 305 are operated to return to the first relative position thereby releasing the carton 135 for further movement along the container path. Carton F illustrates a completed, filled and sealed carton 135.

Figure 3:
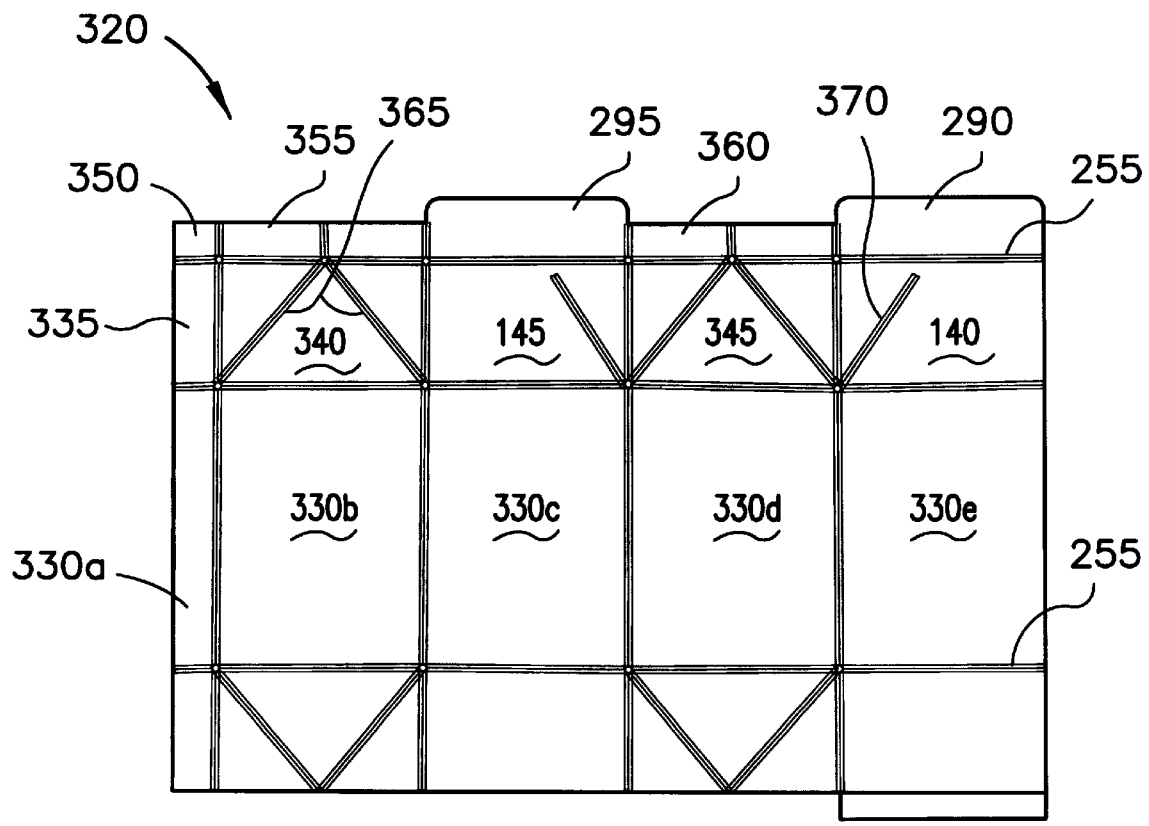
FIG. 3 is a plan view of a carton blank which may be folded to form a gable top carton.

FIG. 3 illustrates one embodiment of a carton blank 320 that may be used in the foregoing apparatus for forming a gable top carton 135. The blank 320 may be formed from any one of a variety of paperboard laminate structures.

For example, the blank 320 may be formed from a laminate, such as that used for milk cartons, having an LDPE/PAPERBOARD/LDPE structure. In such a laminate, the LDPE layers act as barrier layers that, among other things, protect the paperboard from moisture. Other paperboard laminate structures may also be used in which the paperboard is protected by one or more barrier layers.

The blank 320 is divided by a plurality of vertical creases 325 and the plurality of horizontal creases 255. The vertical creases 325 extend from the top to the bottom of the carton blank 320 while the horizontal creases 255 extend substantially along the width of the carton blank 320. The horizontal creases 255 and the vertical creases 325 divide the carton blank 320 into five vertical panels 330a–e, five top gable flaps 335, 340, 145, 345, 140, and five top fin flaps 350, 355, 295, 360, 290. Top gable flaps 340 and 360 are each provided with a pair of converging creases 365. Top gable flaps 140 and 145 are each provided with an angled crease 370.

Figure 4:
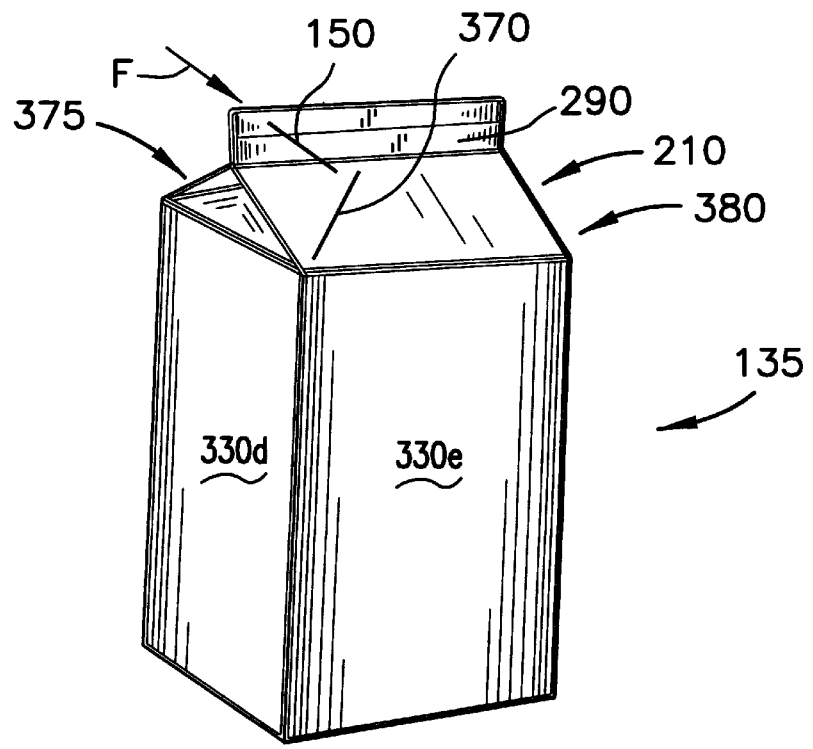
FIG. 4 is a perspective view of a carton formed from the blank illustrated in FIG. 3.

The blank 320 of FIG. 3 is folded to form the gable top carton 135 of FIG. 4. When folded, the vertical panels 330 form respective sides of the carton 135. The top gable flaps 355, 360 form the gable structure 210 while the top fin flaps 290, 295 form the top fin 150. The gable structure 210 is formed by folding top gable flaps 340 and 345 toward one another. Top gable flaps 140 and 145 are likewise folded toward one another to form the gable structure 210. The top fin 150 extends upward from the gable structure 210. As illustrated in FIG. 4, the angled creases 370 are disposed at an opening end 375 of the carton 135 and allow the gable flaps 140, 145 and fin flaps 290, 295 of the carton 135 to be unfolded for opening the carton 135. The fin flaps 290, 295 of the opening end 375 may be returned to their generally closed condition when the user wishes to at least partially seal the carton 135. The opening end 375 is opposite a closed end 380.

When forming and sealing the top fin 150 a sealing force is applied longitudinally along the length of the flaps 290 and 295 in the directions designated by arrow F. The sealing force may also be applied to flaps 140 and 145 during the formation of the fin 150. As the sealing force is applied, flaps 340 and 355 fold toward flaps 345 and 360 to form the gabled structure 210 and fin 150. In some instances, the flaps 340, 355, 345, and 360 do not fold properly toward one another, instead extending outwardly from the interior of the carton 135. This condition is known as the so-called "duckbilling."

Although the present invention has been described with reference to a specific embodiment, those of skill in the art will recognize that changes may be made thereto without departing from the scope and spirit of the invention as set forth in the appended claims.

We claim:

1. An apparatus for forming and sealing a fin at a gabled end of each carton in a plurality of cartons traveling along a predetermined carton path, each carton having a first plurality of opposing top flaps disposed transverse to the predetermined carton path and a second plurality of opposing top flaps disposed longitudinal to the predetermined carton path, one of the second plurality of opposing top flaps having a spout projecting therefrom, the first and second plurality of opposing top flaps adapted to form a gabled structure of a gable top carton, the apparatus comprising:

a first pre-folder for directing the first pair of opposing top flaps of each carton toward each other, thereby causing the second pair of opposing top flaps to be urged toward each other;

a second pre-folder disposed downstream of the first pre-folder along the predetermined carton path for increasingly directing the second plurality of opposing top flaps of each carton together as each carton travels along the predetermined carton path;

a first crimping wheel and a second crimping wheel disposed downstream of the second pre-folder for bending the second plurality of opposing top flaps to form a narrowed fin structure as each carton proceeds therebetween along the predetermined carton path, the first crimping wheel disposed on a first side of the predetermined carton path and the second crimping wheel disposed on the opposite side, each of the crimping wheels having a flat surface and a beveled surface, at least one of the crimping wheels having an annular recessed portion into the flat surface to pass the spout projecting from one of the second plurality of opposing top flaps; and means disposed downstream of the rotating crimping means for sealing the fin of each carton by introducing energy to the fin.

2. The apparatus of claim 1, wherein the means for sealing the fin introduces ultrasonic energy to the fin for sealing.

3. The apparatus of claim 1, wherein the means for sealing the fin introduces thermal energy to the fin for sealing.

4. The apparatus of claim 1, wherein the first pre-folder comprises a pair of linearly actuated arms that are actuatable to move between a first position in which the linear actuated arms are clear of the carton path to allow a carton to freely pass along the predetermined carton path and a second position in which the linear actuated arms engage the carton to apply opposed forces to the first plurality of opposing top flaps, the opposed forces having opposed force components disposed parallel to the predetermined container path.

5. The apparatus of claim 1 wherein the second pre-folder comprises at least one pair of rails positioned on opposite sides of the predetermined carton path to increasingly urge the second plurality of opposing top flaps together as the carton travels along the predetermined carton path.

6. The apparatus of claim 5, wherein the at least one pair of rails is angled with respect to the predetermined carton to form an opening at an inlet end, the at least one pair of rails narrowing to form a narrowed vertex portion at an outlet end.

7. An apparatus for use in forming and sealing a fin at a gabled end of each carton in a plurality of cartons traveling along a predetermined carton path, each carton having a first plurality of opposing top flaps disposed transverse to the predetermined carton path and a second plurality of opposing top flaps disposed longitudinal to the predetermined carton path, one of the second plurality of opposing top flaps having a spout projecting therefrom, the first and second plurality of opposing top flaps adapted to form a gabled structure of a gable top carton, the apparatus comprising:

a first crimping wheel disposed at a first side of the predetermined carton path; and a second crimping wheel disposed at a second side of the predetermined carton path opposite the first crimping wheel, the first and second crimping wheels each being disposed at an angle generally corresponding to an angle of an overlying gable section of the gabled end of each of the plurality of cartons engaged by the first and second crimping wheels, the first and second crimping wheels being spaced from one another to engage the fin therebetween, each of the first and second crimping wheels having a beveled surface and a flat surface such that the flat surface presses against a respective one of the overlying gable sections while the beveled surface presses against the fin as each carton travels along the predetermined carton path, one of the first and second crimping wheels having an annular recessed portion into the flat surface to pass the spout projecting from one of the second plurality of opposing top flaps.

\* \* \* \* \*